United States Patent [19]

Dugge et al.

[11] Patent Number: 4,677,917
[45] Date of Patent: Jul. 7, 1987

[54] HIGH VOLUME COVERED HOPPER CAR WITH LOADING FROM BELOW AND AUTOMATIC UNLOADING

[75] Inventors: Richard H. Dugge; Eugene J. Cordani, both of St. Louis County, Mo.

[73] Assignee: ACF Industries, Incorporated, Earth City, Mich.

[21] Appl. No.: 701,880

[22] Filed: Feb. 14, 1985

[51] Int. Cl.⁴ .................. B61D 7/32; B65G 53/66
[52] U.S. Cl. .................. 105/248; 105/360; 137/574; 137/576; 137/592; 141/67; 141/98; 406/30; 406/119; 406/131; 414/467
[58] Field of Search .............. 105/247, 248, 358, 359, 105/360; 406/30, 119, 118, 109, 131, 156, 120, 39, 41, 174, 170, 175; 414/293, 467, 507; 141/35, 67, 98, 231, 232; 137/592, 574, 576

[56] References Cited

U.S. PATENT DOCUMENTS

| | | | |
|---|---|---|---|
| 1,076,989 | 10/1913 | McClave | 406/174 |
| 1,533,862 | 4/1925 | Hyle | 105/248 |
| 1,707,206 | 3/1929 | Bernert | 406/175 |
| 2,089,347 | 8/1937 | Dondlinger | 406/41 |
| 2,522,077 | 9/1950 | Wahl et al. | 414/526 |
| 2,978,279 | 4/1961 | Bergstrom | 406/174 |
| 3,088,777 | 5/1963 | Aller | 406/119 |
| 3,251,497 | 5/1966 | Simas | 406/170 |
| 3,427,994 | 2/1969 | Keene | 105/248 |
| 3,450,278 | 6/1969 | Adler | 406/156 |
| 3,722,556 | 3/1973 | Jeffers et al. | 141/231 |
| 3,773,392 | 11/1973 | Luiten et al. | 406/131 |
| 4,101,175 | 7/1978 | Kull | 105/248 |
| 4,323,096 | 4/1982 | Dugge et al. | 137/526 |
| 4,352,331 | 10/1982 | Anderson et al. | 105/248 |
| 4,353,667 | 10/1982 | Mandl et al. | 406/30 |
| 4,412,762 | 11/1983 | Lepley et al. | 406/30 |
| 4,466,760 | 8/1984 | Feldsted | 406/41 |

FOREIGN PATENT DOCUMENTS

| | | | |
|---|---|---|---|
| 675440 | 12/1963 | Canada | 105/248 |
| 572009 | 9/1945 | United Kingdom | 406/30 |

Primary Examiner—Randolph A. Reese
Assistant Examiner—Donald T. Hajec
Attorney, Agent, or Firm—Polster, Polster Lucchesi

[57] ABSTRACT

A high volume covered railway hopper car is disclosed which has vertical end walls so as to fully utilize the space over the trucks of the car for lading volume. An automatic pneumatic unloading system is provided so as to unload a pulverant lading from the end compartments or hoppers, as well as the center, of the car, thus eliminating the necessity of sloped end sheets. A pneumatic loading system is provided which permits loading from below and thus permits the elimination of hatches, walkways, and the like on the roof of the car so as to permit the roof to extend substantially the full extent of AAR height clearances thereby to further maximize the lading volume of the car.

14 Claims, 13 Drawing Figures

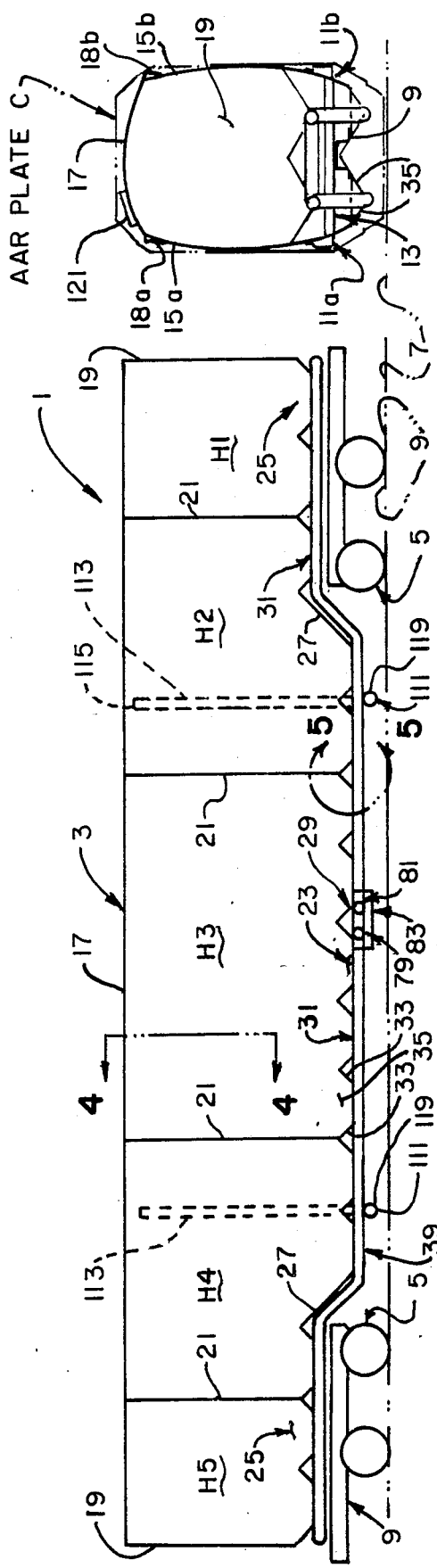
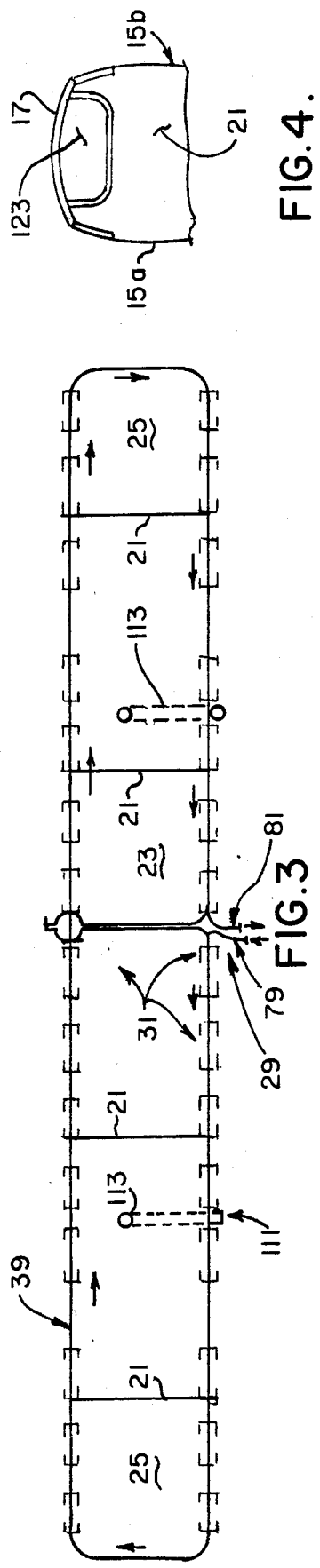

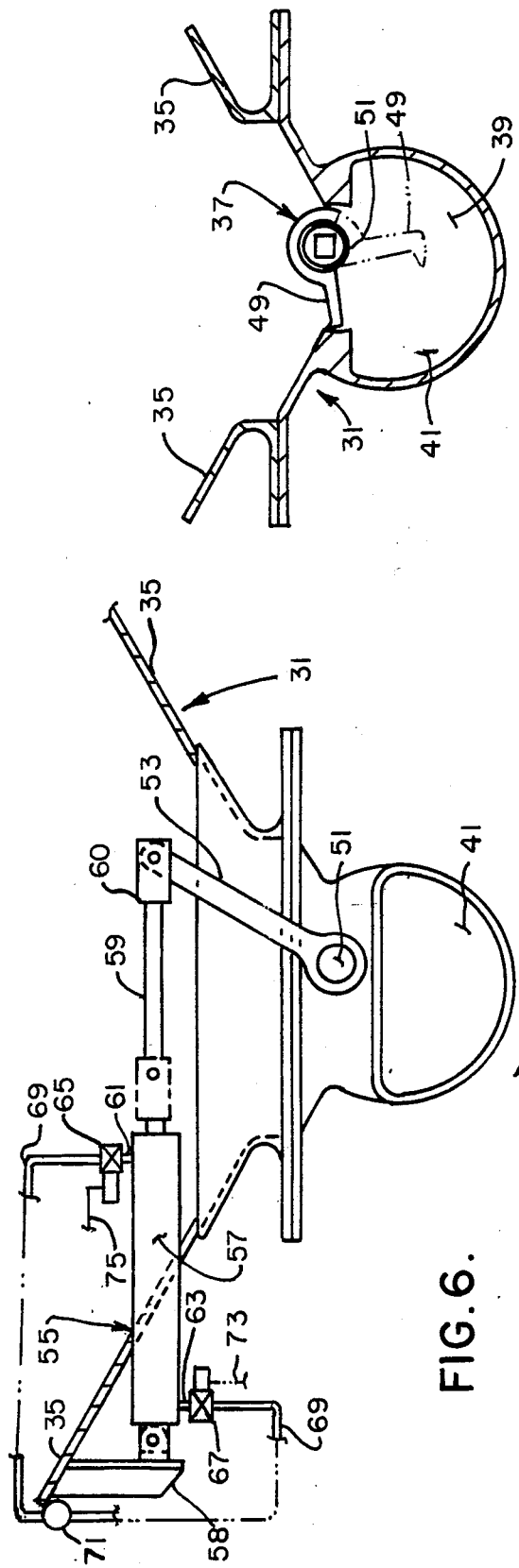

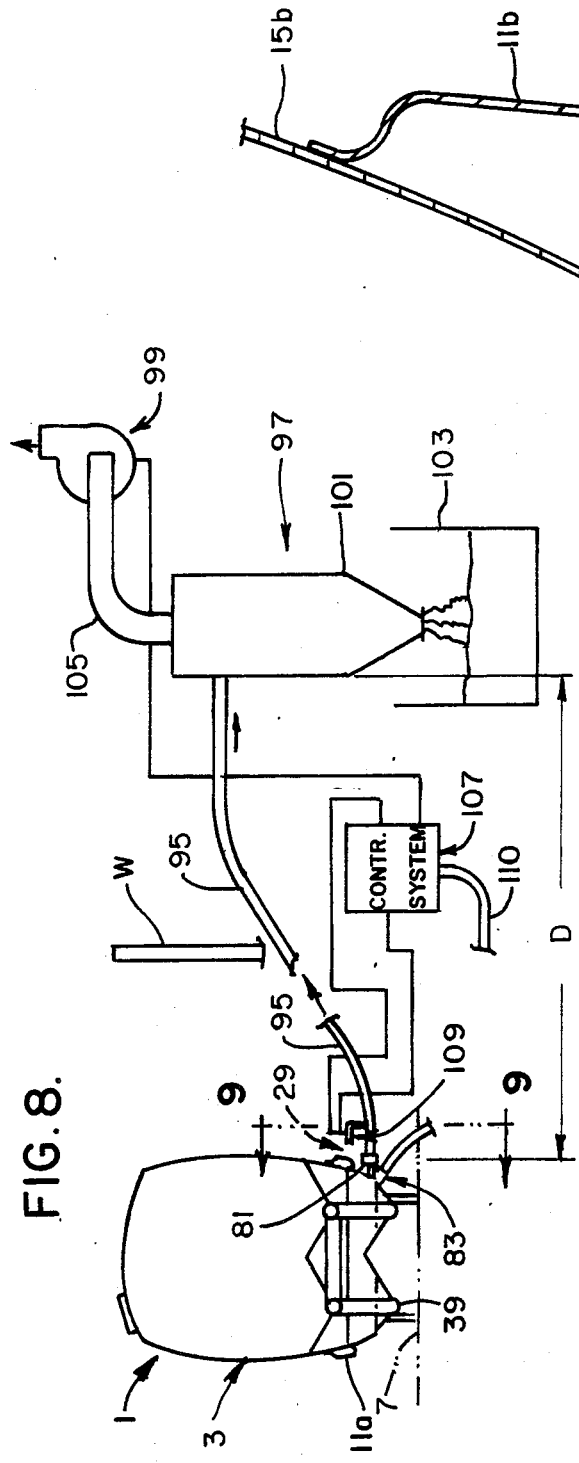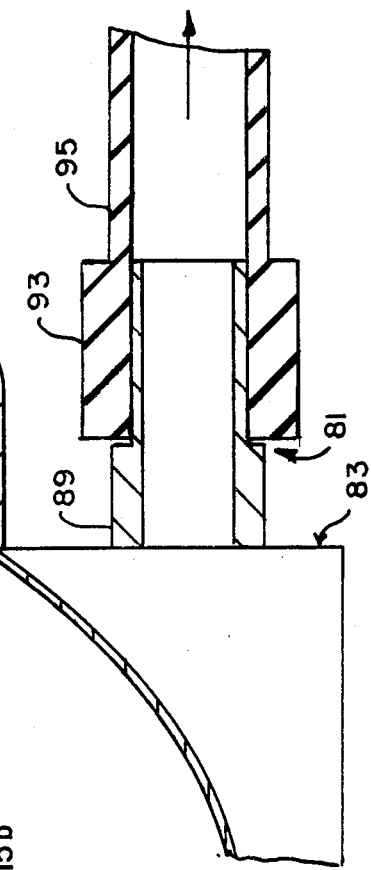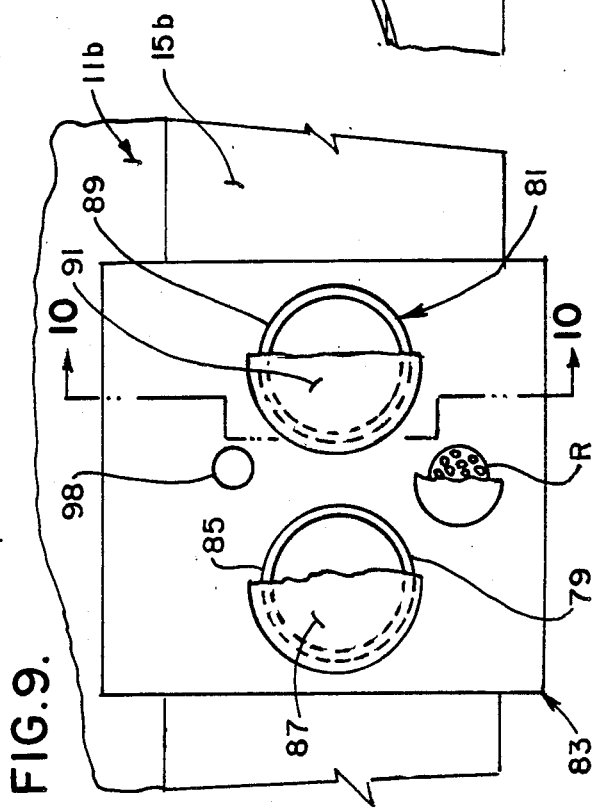

HIGH VOLUME COVERED HOPPER CAR WITH LOADING FROM BELOW AND AUTOMATIC UNLOADING

BACKGROUND OF THE INVENTION

This invention relates to a high volume covered hopper car which more effectively utilizes the space over the trucks at the ends of the car, and which eliminates hatches, walkways, and the like from the roof of the car, thus permitting the car to fully utilize its height for lading volume, and yet fit within AAR clearances.

Covered hopper cars are typically used to transport particulate, granular, or pulverant ladings, such as flour, cement, plastic pellets or powders, and the like. Such covered hopper cars are shown in the prior co-assigned U.S. Pat. Nos. 3,339,499 and 3,490,387. Certain particulate ladings, such as plastic pellets or powders, have bulk densities such that the lading capability of a covered hopper car is limited by its lading volume capability rather than by the weight of the lading. Thus, there has been a long-standing need in the design of covered hopper cars to achieve as high a lading carrying volume as possible.

All railroad cars must fit within a three-dimensional clearance envelope, as defined by the Association of American Railroads (AAR). Generally, this AAR clearance envelope defines the maximum height, width, and length of a car such that the car will be able to negotiate railroad tracks across the country, and be able to pass through tunnels, over bridges, around curves, and past other trackside objects without interference. These clearance standards are specified in the AAR's "Specifications For Design, Fabrication, And Construction Of Freight Cars", which is in part set out in ACF Industries' Shippers' Car Line Division Service Bulletin 12a, entitled "Plate B and Plate C Clearance Diagrams", issued October, 1967, a copy of which is included in the file of the present specification, and is herein incorporated by reference.

Generally, two clearance diagrams or envelopes, known as AAR Plate B and Plate C are utilized. These clearance diagrams are actually composites of the clearance diagrams for all of the railroads in the country and may be considered to be a three-dimensional "tunnel" through which a car must be able to pass without touching the "tunnel". Not only must the car be able to pass through the "tunnel", but all car appurtenances, such as walkways, ladders, hatches, railings, etc., must also be kept within the limits of the diagrams. The AAR has defined a "base" car for both Plate B and Plate C clearances. In general terms, Plate B cars have a somewhat lower height (15 feet, 1 inch) than Plate C cars (15 feet, 6 inches), and may operate in unrestricted interchange service. Since Plate C cars are somewhat taller, these cars may operate in limited or restricted interchange service, and may be permitted only on certain routes. However, the restrictions placed on Plate C cars are relatively few in number, and for purposes of this disclosure, Plate C will be utilized as the standard clearance envelope for the railroad car of the present invention.

As will be appreciated, a freight car must not only be sufficiently narrow and less than a maximum predetermined height to pass through the AAR Plate C clearance diagram, but the maximum allowable width of the car is dependent on the distance between the centerlines of the trucks at the opposite ends of the car, and also on the amount of overhang or swing-out at the ends of the car. As will be appreciated, as a railroad car negotiates a curve, the center section of the car will move radially inwardly and the ends of the cars will move radially outwardly relative to a chord defined by the centerlines of the trucks of the car. The maximum curve considered by the AAR clearance diagrams is a 13 degree curve, having a radius of 441 feet, 8.375 inches. The AAR Plate C base car, having truck centers less than 46 feet, 3 inches, may have a maximum width of 10 feet, 8 inches. However, a car having truck centers spaced at the maximum permitted distance between truck centers of 81 feet, such a car may only be 8 feet, 2 inches wide. Cars of an intermediate length may have a maximum width between these two extremes, with the maximum width being dependent on the length of the car, as defined by the above-noted AAR specifications.

As disclosed in the co-assigned U.S. Pat. No. 4,598,646, a high volume covered hopper car, such as generally shown in the above-noted co-assigned U.S. Pat. No. 3,339,499, is disclosed in which the side sheets forming the sides of the hopper car body are made from three different radii of curvature thereby to both maximize the lading volume of the car and also so as to provide increased resistance to diagonal buckling. However, this last-noted high volume covered hopper car still utilizes hatches (or other openings) in its roof for loading purposes, and also utilizes sloped end sheets above the trucks of the car so as to provide for the gravity feed of the pulverant lading within the end hoppers of the car downwardly toward pneumatic outlets located inwardly of the trucks toward the center of the car and below the level of the trucks. Thus, the roof of such a high volume covered hopper car must be kept below the maximum height permitted by AAR clearance diagrams so as to provide space for hatches, manways, walkways, and the like. Additionally, a substantial amount of lading volume over the trucks of the car at each end thereof was lost, due to the sloped end sheets.

Nevertheless, the high volume covered hopper car disclosed in the above-noted U.S. Pat. No. 4,598,646, represented a significant advance in the covered hopper car art in that the lading volume of that car was approximately 6,404 cubic feet, which represented a 12.4 percent increase in lading volume over other so-called high volume covered hopper cars, while the weight of this new high volume covered hopper car and the efficiency with which it utilized materials from which the car was constructed compared favorably with other covered hopper car constructions which were thought to efficiently use their construction materials.

However, a need nevertheless exists for a covered hopper car which had even greater lading volume.

Also, prior art covered hopper cars typically were unloaded by means of pneumatic unloading systems, such as are described in the co-assigned U.S. Pat. Nos. 4,114,785 and 4,382,725. Generally, these pneumatic outlets extended transversely of the car, with one outlet being provided for each hopper compartment within the car. These prior pneumatic outlets conventionally included a control valve which may be selectively moved from a closed position in which the discharge of the lading from within the hopper is prevented, to an open position in which communication between a fluid conduit and the lading within the car is opened. Typically, in a pneumatic unloading outlet, the flow of air through the conduit causes the particulate lading discharged into the conduit via the control valve to be entrained in the flow of fluid (e.g., air) flowing through the conduit for being pneumatically conveyed from the car. Additionally, pneumatic outlets which incorporated air permeable sides were known which "fluidized" the lading so as to facilitate pneumatic unloading. However, these prior pneumatic outlets required considerable time on the part of attendants to connect pneumatic outlet lines to the pneumatic outlet nozzle, and to continually regulate the opening of the pneumatic outlet control valve so as to best facilitate unloading of the lading.

Heretofore, sloped end sheets were required in covered hopper cars so as to ensure gravity unloading of the lading in the end hopper toward the pneumatic outlet located below the level of the truck toward the center of the car. Thus, heretofore, it has not been practical to eliminate end slope sheets, and thus the space above the truck has not been utilized for lading volume.

SUMMARY OF THE INVENTION

Among the several objects and features of the present invention may be noted the provision of a high volume covered hopper car which utilizes a loading system from below thereby eliminating the necessity of hatches and walkways on the roof of the car, and which in turn permits the height of the car to be extended to the full limits permitted by AAR clearances, thus increasing the lading volume of the car;

The provision of such a covered railway hopper car which efficiently utilizes the space over the trucks of the car so as to increase the lading volume of the car;

The provision of such a covered railway hopper car which incorporates a plurality of pneumatic unloaders, and a system for automatically unloading the lading from within the car with a minimum amount of labor required;

The provision of such a covered railway hopper car which eliminates the necessity of shifting the car or the loading device during loading of the lading;

The provision of such a covered railway hopper car in which the numerous pneumatic outlets are interconnected by a continuous air/lading conveying conduit whereby the pressure drop between the air inlet and the vacuum source inlet is, within a predetermined range, substantially uniform, regardless of the particular pneumatic outlet open to the conduit for pneumatic unloading of the lading from within the car proximate that particular pneumatic outlet;

The provision of such a covered railway hopper car in which, through the elimination of hatches and manways on the roof of the car, enhances protection of the lading from contamination during loading, transit, and unloading;

The provision of such a covered railway hopper car in which the lading volume of the car is maximized, while the materials utilized to construct the car are used with optimum efficiency;

The provision of such a covered railway hopper car which is protected from vacuum and positive internal pressure differentials exceeding a predetermined limit; and The provision of such a covered railway hopper car which is of rugged construction, which will have a long service life, which will provide for efficient transport of low bulk density ladings, which can be manufactured utilizing existing tooling and equipment without substantial modification, and which will not require undue special training for the attendants loading and unloading the car.

Other objects and features of this invention will be in part apparent and in part pointed out hereinafter.

Briefly stated, a high volume covered hopper car of the present invention has a truck at each end thereof. The car has a covered hopper body extending generally between the trucks, with the body having a pair of spaced side sheets extending upwardly, and a roof spanning between the upper margins of the side sheets. The roof extends substantially the full height permitted by AAR clearance diagrams, and manways, hatches, and the like are eliminated from the top surface of the roof thereby to substantially increase the lading volume. A pneumatic loading system operable from below is provided for loading a pulverant lading into the covered hopper car. This pneumatic loading system comprises at least one standpipe disposed vertically within the hopper car body, with the upper or outlet end of the standpipe in communication with the interior of the car. The standpipe is connected to a fitting extending out beyond the lower regions of the car, this fitting being adapted to have a pneumatic loading hose or conduit connected thereto for pneumatically conveying the lading into the car, and for discharge from the outlet end of the standpipe into the car body.

In another embodiment of the covered hopper car of the present invention, the ends of the covered hopper body are defined by generally vertical end sheets and a generally horizontal end floor disposed above the trucks of the car at the ends thereof. A plurality of pneumatic outlets are provided for unloading the lading, both at the end hoppers of the car above the trucks, and at the central regions thereof.

BRIEF DESCRIPTION OF THE DRAWINGS

FIG. 1 is a side elevational view of a high volume covered hopper car of the present invention, incorporating a pneumatic loading system operable from below thereby eliminating the necessity of hatches, walkways, and the like on the outer surface of the roof thereby permitting the roof to be positioned at the maximum vertical extend permitted by AAR clearances, and further incorporating another embodiment of the present invention constituting a pneumatic unloading system which permits the sloped end sheets of prior art cars to be eliminated, and which permits the use of vertical end sheets with a generally horizontal floor over the trucks of the car so as to significantly increase the lading volume of the car;

FIG. 2 is an end elevational view of the car, showing the AAR Plate C clearance diagram surrounding the car;

FIG. 3 is a diagrammatic top plan view, showing a plurality of automatically operable, pneumatic outlets, each pneumatic outlet having a control valve associated therewith, with each of the pneumatic outlets being serially connected by means of a fluid conduit for the serial flow of air and lading from one end of the conduit, constituting the air inlet end, to the other end of the conduit, constituting the product outlet end;

FIG. 4 is a vertical cross sectional view, taken along line 4—4 of FIG. 1, illustrating an internal partition within the hopper car body, with a cutout therein permitting the lading discharged into one hopper within the car to flow into an adjacent hopper;

FIG. 5 is an enlarged view, taken along line 5—5 of FIG. 1, showing two adjacent pneumatic outlets coupled together by a flow conduit extending therebetween, and further illustrating a power-operated air cylinder for controlling operation of its pespective pneumatic outlet;

FIG. 6 is a vertical cross sectional view, taken along line 6—6 of FIG. 5, showing the pneumatic conduit and the air cylinder for controlling operation of the pneumatic outlet;

FIG. 7 is a cross sectional view, taken along line 7—7 of FIG. 5, illustrating the control valve in relation to the conduit, showing (in solid lines) the control valve closed and showing (in phantom lines) the control valve opened;

FIG. 8 is a semi-diagrammatic view of a covered hopper car of the present invention, on a siding proximate a building in which a pneumatic unloading system, together with a control system of the present invention, is housed for controlling the automatic pneumatic unloading of the covered hopper car of the present invention;

FIG. 9 is a view taken along line 9—9 of FIG. 8, illustrating, on an enlarged scale, a panel located below the side sill at the center of the car, including an air inlet nozzle protected by a removable cover (a part of which is broken away), a product discharge port also covered by a removable cover or cap (part of which is also broken away), a multi-terminal electrical receptacle, and a compressed air inlet fitting;

FIG. 10 is a view taken along line 10—10 of FIG. 9, illustrating the product discharge outlet having a discharge duct or hose sealably secured thereto for pneumatically conveying the lading from the car in the manner shown in FIG. 8;

Corresponding reference characters indicate corresponding parts throughout the several views of the drawings.

DESCRIPTION OF PREFERRED EMBODIMENTS

Figure 11:
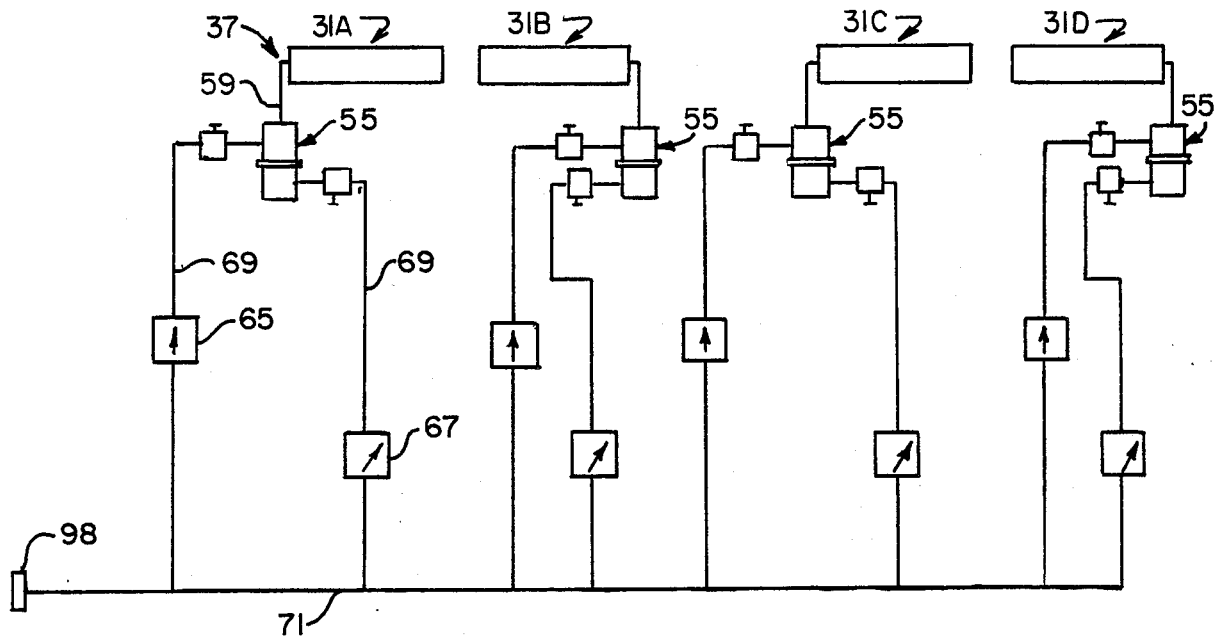
FIG. 11 is a semi-diagrammatic view of a plurality of (e.g., four) pneumatic outlets, air cylinders for operating the outlets, an air supply system, and solenoid valves for selectively operating the air cylinder associated with each of the outlets.

Referring now to the drawings, a covered hopper car of the present invention is indicated in its entirety by reference character 1. The hopper car 1 includes a hopper car body, as generally indicated at 3, supported by conventional trucks 5 at each end of the car, the trucks running on rails 7. More particularly, hopper car 1 is shown to be a so-called center stub sill car having a center stub sill assembly, as generally indicated at 9, located above trucks 7 and carrying a conventional coupler (not shown) for coupling the cars of the present invention to other railroad cars. Side sills, as generally indicated at 11a, 11b, extend longitudinally of the car, and are disposed somewhat above the level of the coupler (not shown) carried by center stub sill assembly 9. As is typical, structure, generally indicated at 13, is provided for securely tieing center stub sill assembly 9 to side sills 11a, 11b. The side sills and center stub sill carry train loads longitudinally of the car and car body 3 is supported on trucks 5 by means of the side sills. Arcuate side sheets, as indicated at 15a, 15b, extend upwardly from side sills 11a, 11b and form the sides of car body 3. An arcuate roof 17 spans between and is secured to the upper margins of the side sheets. So-called side plates, as indicated at 18a, 18b, are secured (welded) to the upper margins of side sheets 15a, 15b so as to structurally reinforce the side sheets to withstand certain train loads and bearing loads of the car imposed on the upper margins of the side sheets.

Further, car body 3 includes vertically disposed end sheets 19 at each end of the side sheets 15a, 15b, and the car body has a plurality of vertically arranged intermediate partition sheets, as indicated at 21, extending transversely of the side sheets and welded to the inside faces thereof so as to form a plurality of compartments or hoppers, H1-H5, extending longitudinally of the car. These hoppers include two end hoppers, as indicated at H1 and H5, and one or more intermediate hoppers, as indicated at H2-H4. It will be understood within the broader aspects of this invention, car body 3 may be provided with any number of hoppers.

Car body 3 of the present invention has a central floor portion 23 extending generally between trucks 5. The car has an end floor portion 25 above each of the trucks, and a slope floor portion 27 serving as a transition between the cente floor portion 23 and the raised end floor portions 25. In this manner, it will be recognized that through the use of vertical end sheets 19 and the use of the generally horizontal end floor portions 25 above the trucks 5, the space or volume taken up by the car in the area over the trucks is utilized for lading carrying capacity. The use of the vertical end sheets 19 and the generally horizontal end floor portions 25 differ markedly from prior art covered hopper cars, such as shown in the co-assigned U.S. Pat. No. 3,339,499.

However, such prior art covered hopper cars, as shown in the above-mentioned co-assigned patent, unloading of these cars was typically accomplished through the use of pneumatic outlets, such as shown in the co-assigned U.S. Pat. No. 4,114,785, or through the use of a fluidized pneumatic outlet. Regardless of whether a pneumatic or a fluidized outlet was utilized for unloading purposes, it was conventional practice to utilize sloped end sheets, as shown in the above-noted U.S. Pat. No. 3,339,499, for the gravity feeding of the lading from the upper end portions of the end hoppers of the car to the pneumatic or fluidized unloading device. The requirement of providing sloped end sheets in prior art cars was thus necessary to ensure unloading of the pulverant lading from the end hoppers of the car, but the requirement of the sloped end sheets prevented utilizing the space over the trucks of the car for lading carrying capability.

Car 1 of the present invention incorporates an automatic pneumatic unloading system, as generally indicated at 29, for pneumatically (or for the fluidized) unloading of a pulverant, granular, or powdered lading from within car body 3, not only from the intermediate hoppers H2-H4, but also from the generally horizontal floor portions 25 at the end portions of the car above trucks 5. Moreover, the automatic pneumatic unloading system 29 of the present invention minimizes the amount of labor and attention required by train attendants to accomplish unloading of a pulverant lading in an expeditious manner.

More specifically, pneumatic unloading system 29 comprises a multiplicity of pneumatic (or fluidized/pneumatic) outlets 31 disposed throughout the center floor 23 and the end floors 25 of car 1 of the present invention, with the pneumatic outlets 31 being so disposed along the floor as to be able to pneumatically unload substantially all of a pulverant, granular, or powdered lading from within car body 3. As shown in FIG. 3, thirty of these pneumatic outlets 31 are provided to constitute automatic pneumatic unloading system 29. Each of these pneumatic outlets may, for example, be similar to the pneumatic outlet shown in the co-assigned U.S. Pat. No. 4,114,785, which is herein incorporated by reference. Such pneumatic outlets are commercially available from ACF Industries, Incorporated, St. Louis, Missouri, and are identified by the trade designation Model 5135 pneumatic outlet. Generally, these pneumatic outlets include a pair of front and rear transverse slope sheets 33 and a pair of longitudinally extending slope sheets 35 (as shown in FIGS. 5–7), which slope inwardly and downwardly toward an elongate rotary control valve, as indicated at 37. Each of the pneumatic outlets 31 constitutes a part of a flow path or loop 39 which serially interconnects all of the pneumatic outlets 31. Each of the pneumatic outlets 31 further includes an enclosed trough or passageway 41 beneath each of the respective longitudinal rotary control valves 37, and each of these closed troughs 41 constitutes, at least in part, a part of flow path 39. Further, each trough 41 has an inlet end 43 and an outlet end 45, as best shown in FIG. 5. A conduit coupling, as indicated at 47, constitutes the outlet end of one pneumatic outlet trough, with the inlet end of the next adjacent pneumatic outlet downstream from the first-mentioned pneumatic outlet such that the troughs 41, the inlet ends 43, and the outlet ends 45 of each of the pneumatic outlets, together with conduit coupling 47 constitute the major portion of flow path 39.

Referring still to FIGS. 5–7, control valve 37 is shown to comprise a rotary valve member 49 journaled at its ends relative to the structure of the pneumatic outlet 31 constituting trough 41. The rotary valve member 49 is rotatably mounted on a longitudinally extending valve shaft 51, and a valve operating lever 53 is secured to one end of shaft 51. A power actuator, such as a double acting pneumatic cylinder 55, is operatively connected to valve lever 53 for selectively moving the valve lever (and hence control valve 37) between a closed position (as shown in solid lines in FIG. 7) in which the lading within hopper car body 3 disposed generally above a respective pneumatic outlet 31 is blocked from communication with trough 41 disposed beneath control valve 37, and an open position (as shown in phantom in FIG. 7) in which lading above the control valve is free to fall downwardly into trough 41, and to be entrained in an airstream forcefully circulated or drawn through flow path 39.

As mentioned, power actuator 55 is a double acting pneumatic cylinder, having an air cylinder body 57 secured to hopper car body 3 by means of a bracket 58. The air cylinder has a piston and rod assembly 59 having a clevis 60 on its outer or rod end which is pinned to valve operating lever 53. Air cylinder body 57 is provided within an inlet 61 at the rod end thereof, and with another inlet 63 at the base end of the air cylinder body. A remotely operable solenoid valve 65 is provided for inlet 61, and a similar remotely operable solenoid valve 67 is provided for inlet 63. Air supply lines 69 interconnect the solenoid valves 65 and 67 with a compressed air supply conduit 71 (shown in FIG. 6), which extends from one pneumatic outlet 31 to another generally in the same loop pattern as shown for the pneumatic unloading system flow path 39 shown in FIG. 2. Further, solenoid valve 65 is provided with a respective electrical lead 73, and solenoid 67 is provided with its respective electrical lead 75, these electrical leads being selectively energizable by a pneumatic outlet control system, as will be hereinafter described, for selectively opening and closing the solenoid valves 65 and 67 thereby to selectively extend or retract rod 59, and thus to effect selective opening and closing of the control valve 37 associated with each of the outlets 31 so as to ensure that the pulverant lading above the control valve of each of the outlets is properly entrained within the airstream moving through conduit 41 for pneumatic unloading purposes. Each of the electrical leads 73 and 75 for the solenoid valves associated with each power actuator provided for each of the pneumatic outlets 31 is bundled into an electrical lead wire bundle, as generally indicated at 77 in FIG. 6. Like compressed air supply line 71, electrical lead wire bundle 77 extends around car body 3 and generally conforms to the loop shape of flow path 39. However, those skilled in the art will recognize that any expeditious arrangement for compressed air supply 71 and for electrical lead wire bundle 77 may be incorporated in car 1 within the broader aspects of this invention.

Flow path 39 further includes an air inlet nozzle, as indicated at 79, and an air and product discharge port 81, with the air inlet nozzle and discharge ports being at opposite ends of the flow path. As is shown in FIG. 8, and as will be described in detail hereinafter product discharge port 81 is adapted to be connected to a positive displacement blower for forcefully drawing air through air inlet nozzle 79, through flow path 39 past each of the pneumatic outlets 31, and from the product discharge port 81 to the blower. The air circulating through flow path 31 travels at a relatively high velocity such that when a selected control valve 37 is opened (in a manner as will appear), the pulverant lading above the control valve will flow downwardly into conduit 41 and become entrained in the air flow moving through conduit 41 for being pneumatically conveyed from car body 3.

As best shown in FIGS. 8–10, air inlet nozzle 79 and air and product discharge port 81 are mounted on a panel 83, provided at the center of car 1, generally below the level of side sills 11a, 11b for ready access thereto by an attendant standing at ground level adjacent rails 7. As shown in FIG. 9, two such panels 83 may be provided on opposite sides of the car from one another, with each of the panels having an air inlet nozzle 79 and an air and product discharge port 81, such that the car may be unloaded from either side without the necessity of having air supply hoses and product conveying hoses strung underneath the car. More specifically, air inlet nozzle 79 comprises a pipe end 85 rigidly secured to panel 83 and extending out beyond the end of the panel. A cap 87 is removably secured in place on threaded pipe 85, thus closing and sealing the entrance end to flow path 39. Of course, during unloading operations, one of the caps 87 must be removed from the pipes 85 on one side of the car so that atmospheric air may be readily drawn into the flow path 39. A suitable filter may be employed on the open pipe 85 to prevent airborne contaminants from entering flow path 39. Panel 83 further includes a slip fit male fitting 89 rigidly secured (e.g., welded) to the outlet end of flow path 39, constituting the air and product discharge port 81. Normally, during transit and the like, the product discharge port is closed by means of a removable cap 91, as shown in FIG. 9. During unloading operations, cap 91 is removed from fitting 89, and a conventional slip fit female fitting, as indicated at 93, is coupled to male fitting 89. The female coupler fitting 93 has a product discharge hose 95 secured thereto such that the air entrained lading circulated through flow path 39 may be air conveyed from car body 3 in the manner as shown in FIG. 8.

Referring again to FIG. 8, a stationary pneumatic conveying system, as generally indicated at 97, is typically provided at the destination of car 1 of the present invention. As is typical, car 1 is moved onto a rail siding, located adjacent to, but some distance from the walls W of the user's building. As shown in FIG. 8, the pneumatic conveying system 97 is located within the walls of the user's building, but it will be understood that a variety of other air or pneumatic conveying systems may be utilized. Additionally, panel 83 includes a compressed air inlet fitting 98, in communication with compressed air supply manifold 71, for supplying compressed air (or another compressed fluid) to power actuators 55 via their respective solenoid valves 65 and 67. It will be understood that fitting 98 may be a conventional quick connect male fitting, such that a supply of shop air or the like may be readily connected to air supply manifold 71.

Referring to the pneumatic unloading system 97 shown in FIG. 8, the system comprises a large capacity positive displacement blower 99, driven by a suitable electric motor (not shown). The positive displacement blower 99 creates a vacuum so as to draw or move atmospheric air through air inlet nozzle 79 of flow path 39, to circulate the air at relatively high velocity through flow path 39, to selectively entrain a pulverant lading from one or more of the pneumatic outlets 31, to draw the air and the lading entrained therein through the remainder of the flow path, and to discharge the air and the lading into product discharge hose 95. Thus, the lading is conveyed from car 1 into the building and is exhausted into an air and lading separator 101. In separator 101, the velocity of the air decreases markedly, thus causing the lading to fall downwardly for discharge into a storage pit 103. It will be understood that rather than discharging the lading into a storage pit, the lading may be further pneumatically conveyed into storage bins or the like, such that the lading remains under sealed, sanitary conditions. The top of separator 101 is connected to the inlet side of blower 99 by means of a conduit 105. Appropriate dust filters and the like (not shown) may be incorporated between separator 101 and blower 99 in the conventional manner. For purposes as will appear hereinafter, the distance D from railroad car 1 of the present invention located on a siding proximate wall W to separator 101 may be relatively large (several hundred feet or more), as compared to the length of flow path 39 from air inlet 79 to product discharge port 81.

Further in accordance with this invention, a control system for monitoring and controlling the automatic pneumatic unloading of hopper car 1 of the present invention is indicated in its entirety by reference character 107. Typically, this control system would be mounted on a control panel located at the end user's facility. This control system may be similar to the control system disclosed in the co-assigned U.S. Pat. No. 4,544,306, which is herein incorporated by reference. While the above-identified co-assigned U.S. patent application has been incorporated by reference, some of the more salient features of this control system will be herein described, but for a more complete description of the control system, reference should be made to the above-noted co-assigned U.S. patent application.

More specifically, control system 107 includes means, as indicated at 109, for sensing a change in the pressure of the air and lading conveyed through flow path 39 and discharged into product discharge hose 95. The pressure of the air and lading moving through product discharge hose 95 to the inlet side of positive displacement blower 99 may operate within a predetermined range of negative pressure or vacuum (as compared to atmospheric pressure). For example, depending on which of the pneumatic outlet 31 included within the pneumatic unloading system 29 is being utilized to entrain loading from within car 1 into the air flowing through flow path 39, depending on the amount of lading being entrained, and depending on the distance D between the car and the inlet side to blower 99, the negative pressure or vacuum may, for example, range between about 8–12 inches of water relative to atmospheric pressure. In other applications with other ladings, this pressure range may be between about 28–32 inches of water, or more. However, upon the lading in communication with the particular pneumatic outlet or outlets 31 being utilized to entrain the lading in the airstream being unloaded (i.e., a portion of the car proximate the particular pneumatic outlets being emptied of lading), the negative pressure within product discharge line, as sensed by pressure differential sensing means 109, will change significantly so as to be outside of the above-mentioned predetermined range of negative pressure. In the manner described in U.S. Pat. No. 4,544,306, this change in differential pressure is monitored by pressure differential sensing means 109, and the control system 107 will generate a signal in response to the discharge pressure exceeding its predetermined level, this signal being indicative of the lading being emptied from the particular pneumatic outlet 31 being utilized. It will be appreciated that because the length of flow path 39 is relatively short in comparison to the typical length of product hose 95, as indicated by distance D in FIG. 8, which one of the various pneumatic outlets 31 almong flow path 39 which is opened to effect pneumatic unloading of the lading will not so affect the pressure change monitored by sensing means 109 such that the pressure differential sensed by the sensing means will be outside the predetermined pressure levels.

Control system 107 will thus send appropriate command signals via an umbilical cable 110 to a female receptacle R included on panel 83 (see FIG. 9), to which electrical lead wire bundle 77 is terminated. It will be appreciated that umbilical cable 110 may be provided with a suitable male plug (not shown) adapted to mate with receptacle R such that control system 107 may readily selectively control each pneumatic cylinder 55 connected to each of the above-noted solenoid valves 65 and 67 associated with each air cylinder 55 such that each respective pneumatic outlet 31 may be appropriately controlled by opening and closing of the control valve 37 associated with each pneumatic outlet 31. Further, control system 107 will automatically monitor the pressure differential in discharge hose 95 and will position the control valve 37 of any selected pneumatic outlet 31 at any position between its fully closed and fully opened positions for optimizing the flow of the lading from the car and for entraining the lading in the airstream passing through conduit 41 below the control valve.

As mentioned, upon the pressure sensing means 109 sensing a pressure change in excess of the above-noted predetermined range of pressures, thus indicating that the lading in communication with the pneumatic outlet 31 being utilized has been unloaded, control system 107 may, for a limited period of time (e.g., 30 seconds), continue to maintain the control valve 37 of the "emptied" pneumatic outlet 31 in its open position thereby to facilitate the clean-out of the lading in communication with that particular pneumatic outlet. Then, control system 107 will send appropriate electrical signals to the solenoid valves 65 and 67 associated with the pneumatic cylinder 55 for the pneumatic outlet from which the product has been emptied so as to fully close that control valve. Control system 107 will then energize the solenoid valves of another pneumatic cylinder 55 associated with another pneumatic outlet 3 so as to initiate the pneumatic unloading of the lading from this other outlet. This procedure will be repeated (preferably sequentially around flow path 39) until such time that all of the pneumatic outlets 31 have been opened, such that all of the lading in communication with the pneumatic outlets (an thus all of the lading within car 1) has been automatically, pneumatically conveyed from the car. It will be appreciated that in this manner, since control system 107 will automatically seek the optimum setting of the control valve 37 of each of the pneumatic outlets 31, optimum pneumatic unloading of the lading will be maintained. It will also be observed that control system 107 will automatically unload the entire contents of car 1 without the necessity of manual adjustment by an attendant. Thus, the labor required to pneumatically unload a car 1 of the present invention is significantly less than with prior art cars.

Figure 12:
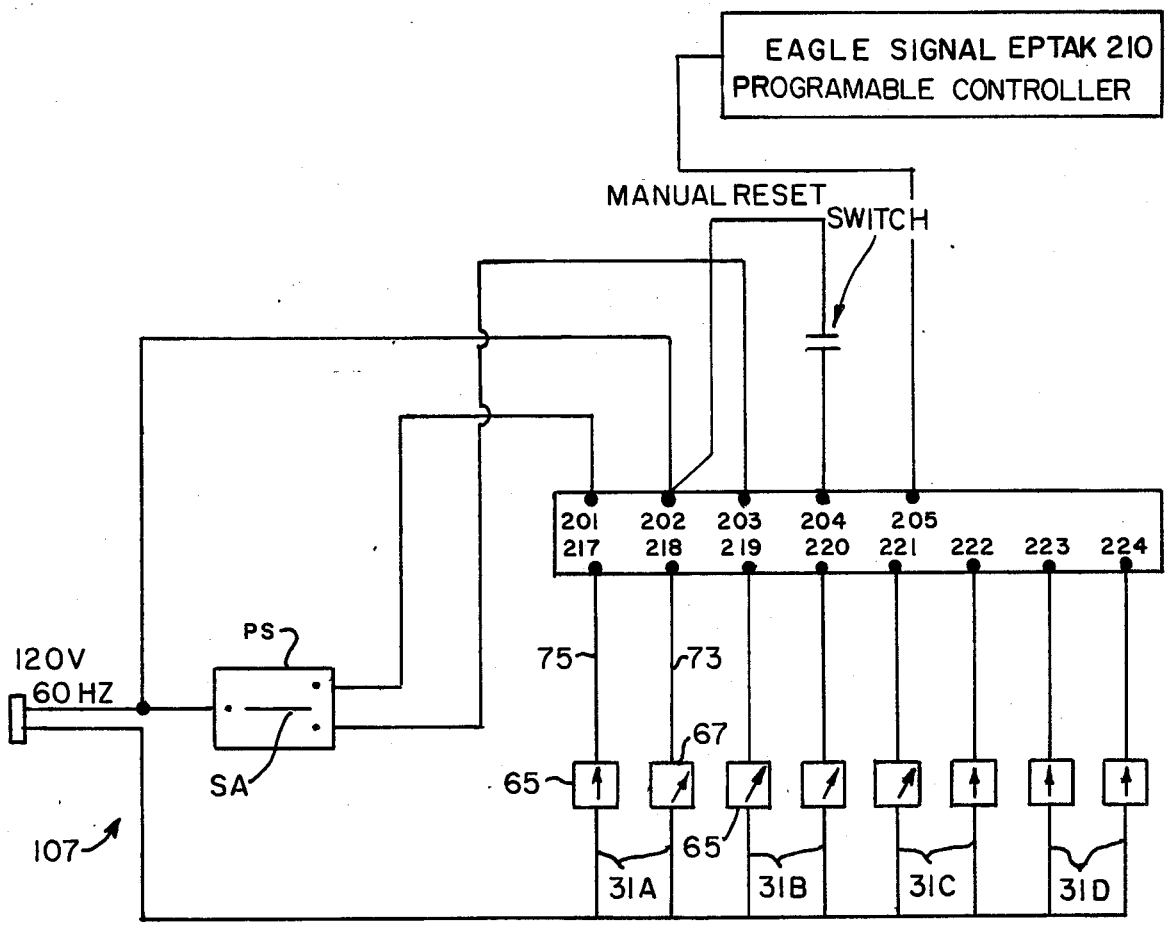
FIG. 12 is a wiring schematic for the control system controlling operation of the four outlets shown in FIG. 11.
Figure 13:
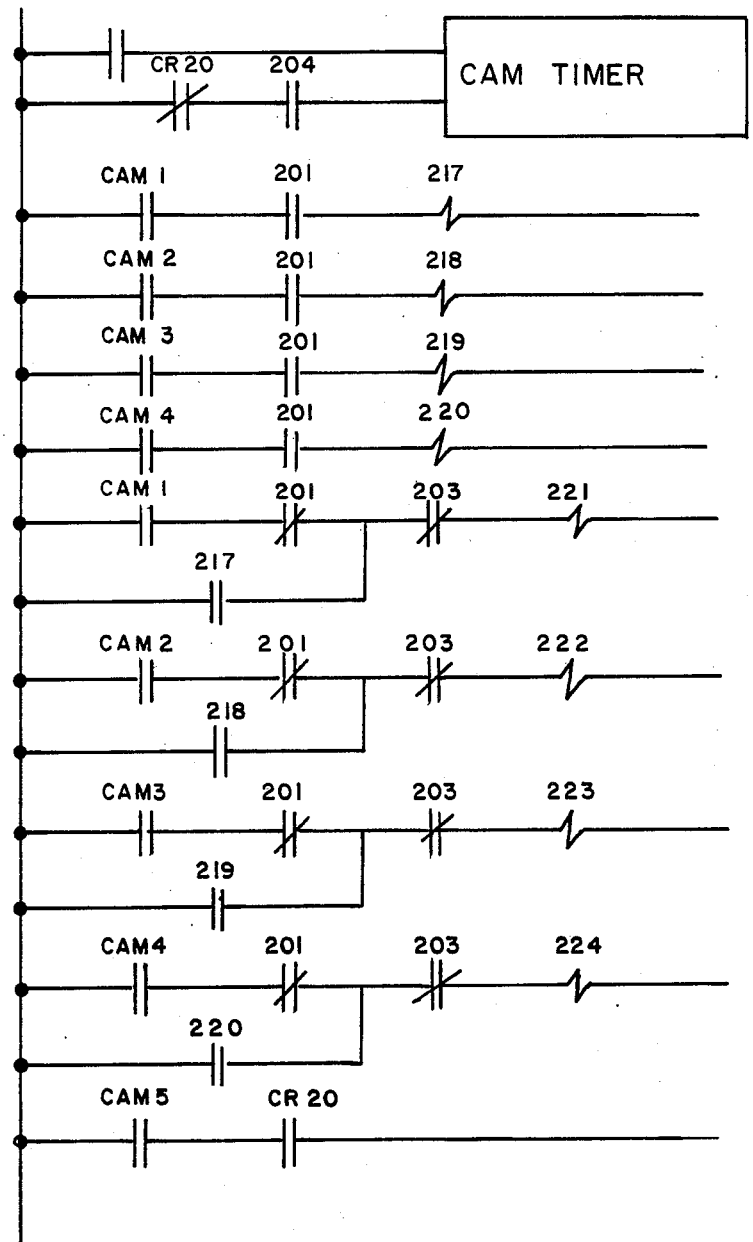
FIG. 13 is a logic control schematic for the control system of FIG. 12.

Referring now to FIGS. 11–13, a more detailed description of the construction and operation of one type of control system 107 will be described. However, within the broader aspects of this invention, a variety of other control systems may be utilized. More specifically, in FIG. 11, for the purposes of brevity, only four pneumatic outlets 31A–31D are shown. However, the construction and operation of the control system 107 for the thirty such outlets shown in FIG. 3 are similar. More specifically, in the embodiment shown in FIG. 11, the solenoid valve 65 associated with each air cylinder 55 for each of the outlets 31A–31D may be a normally open valve, and the solenoid valve 67 may be a normally closed valve, such valves as may be commercially available from Humphrey Products, Kalamazoo, Mich. Flow control valves FC (as shown in FIG. 11) may be interposed between the ports of each of the air cylinders 55 and their respective solenoid valves 65 and 67 so as to accurately control the rate at which the cylinder is actuated upon energization or de-energization of its respective solenoid valves.

As shown in FIG. 12, the solenoid valves 65 and 67 for controlling the double acting air cylinder 55 of each of the outlets 31A–31D are controlled by a programmable controller PC, which in turn is responsive to a signal from a floating contact-null pressure switch PS. This pressure switch PS constitutes a part of the pressure sensing means 109, which monitors the pressure of the air and lading flowing through product discharge hose or conduit 95 to the pneumatic conveying system 97, such as shown in FIG. 8. For example, programmable controller PC may be an Eptak 210, commercially available from Eagle Signal Controls, Austin, Texas. Generally, such programmable controllers contain a processor which controls up to 64 relays, with the processor, in turn, being controlled by a programmer such that the operation of the control relays in the processor may be readily programmed, depending on the configuration of the particular unloading system being utilized and the lading being unloaded. Since such programmable controllers are well known and such the programmable controller, per se, does not constitute a part of the instant invention (i.e., a number of commercially available controllers may be utilized), a complete description of the programmable controller PC, its construction, operation, and program, is not deemed necessary. Further, the pressure switch PS may, for example, be a Model 16040-10 pressure switch commercially available from Dwyer Instrument, Inc., of Michigan City, Indiana. It will be appreciated that a pressure signal (not shown in FIG. 12) from the pressure sensing means 109 (as shown in FIG. 8) actuates the switch arm SA of the pressure switch so as to be in a null position (as shown in FIG. 12) when the flow of air and pulverant lading from one of the outlets is within a desired pressure differential range, as sensed by pressure sensing means 109. In the event the pressure differential sensed by the pressure differential means is outside the desired pressure differential range, the switch arm SA will move in one direction or the other so as to make contact with one or the other of a pair of fixed contacts, thus providing a signal to the programmable controller PC, which in turn energizes one or the other of the solenoid valves 65 or 67 controlling operation of the cylinder 55 associated with the particular outlet, which is open or partially opened thereby to optimize the pneumtic unloading of the pulverant lading therefrom.

Upon the exhaustion of the lading from communication with the one outlet being unloaded, the pressure differential will change so as to be outside of the desired range of pressure differentials such that even when the control valve 37 for the outlet is fully opened, the pressure differential cannot be maintained within this desired range. As heretofore explained, after the pressure has been outside of the desired range of pressure differential for a predetermined length of time (e.g., 30 seconds), programmable controller PC is so programmed as to close the control valve 37 for the one outlet (e.g., 31A), and so as to energize the solenoid valves for the next successive outlet (e.g., 31B), so as to initiate pneumatic unloading of the pulverant lading from the next successive outlet. This process is continued until all of the lading within the car (or a desired portion thereof) has been pneumatically unloaded.

Those skilled in the art will appreciate that through the use of the construction of car 1 as above described, and through the use of the pneumatic unloading system 29, appreciable lading volume within car 1 of the present invention may be realized inasmuch as the space above trucks 5 of the car of the present invention has generally flat end floor portions 25 and vertical end walls 19 which permit the space above the trucks to be utilized. In prior art hopper car designs, it was necessary to provide a sloped end sheet for the gravity feeding of the pneumatic outlets set inboard (i.e., toward the center) of trucks 5.

Another embodiment of the present invention is shown to be incorporated in car 1 of the present invention. More specifically, this other embodiment includes means, as generally indicated at 111, for the pneumatic loading of a pulverant or powdered lading into car body 3 without access to the car body from the roof 17 of the car via hatch covers or the like (not shown), and further for permitting the pneumatic loading of the lading from below at a position conveniently accessible by an attendant standing substantially at ground level. Those skilled in the art will appreciate that the pneumatic loading system 111 may be utilized in conjunction with the construction of hopper car 1 as above described or, alternatively, in conjunction with prior art hopper cars, such as shown in the co-assigned U.S. Pat. No. 3,339,499.

More specifically, pneumatic loading system 111 is shown to comprise a pair of generally vertically disposed standpipes 113 in intermediate hoppers H2 and H4. The upper ends of standpipes 113 constitute standpipe outlet ends 115, and these outlet ends are preferably adjacent, but spaced below, the inner surface of car roof 17. The lower ends of the standpipes are in communication with a respective generally horizontal loading conduit 117, which extends exteriorally of car body 3, and which is provided with a male fitting 119 of a conventional cam and groove coupler This fitting may, for example, be similar to male fitting 89 shown in FIG. 10, and heretofore described in regard to the pneumatic unloading system 29 of the present invention.

In opertion, to load car 1 with a pulverant, granular, or powdered lading, a lading supply hose connected to a suitable loading pneumatic conveyor system (not shown) is coupled to male fitting 119 in the conventional manner. The pneumatic conveying system is then activated such that the pulverant lading entrained with an airstream passing through the loading hose will convey the lading into horizontal loading conduit 17 so as to be discharged from the outlet ends 115 of standpipes 113. In this manner, car body 3 acts like the separator 101 heretofore described in regard to pneumatic conveying system 97. A combination vacuum and pressure relief valve, such as shown in the co-assigned U.S. Pat. No. 4,398,557, is incorporated within car body 3 at various locations therearound so as to permit air to enter or exit the interior of car body 3, both during pneumatic unloading and pneumatic loading of the lading thereby to ensure that the pressure within the car remains substantially at atmospheric pressure. Preferably, relief valves 121 are located in roof 17 of the car, but are located off the crown or center of the car such that the relief valves 121 do not project above.the level of the crown or center of roof 17.

Those skilled in the art will recognize that the pneumatic standpipe loading system 111 of the present invention is particularly convenient to utilize in that a train attendant, to load car 1 of the present invention, merely needs to couple a pneumatic discharge hose to fitting 119 and to initiate operation of the pneumatic loading system. The lading discharged from the outlet ends 115 of standpipes 115 tends to settle downwardly within the car, and to fill the hoppers H1–H5 from the bottom up. Cut outs 123 in transverse partitions 21 may be provided at the upper reaches of the partitions (and also at lower positions) in partitions 21 to permit the pulverant material discharged from a standpipe 113 in one of the hoppers (e.g., in hopper H2) to flow longitudinally of the car into an adjacent hopper (e.g., into hoppers H1 and H3).

It will further be noted that the discharge ends 115 of standpipes 113 are preferably located proximate (i.e., spaced 6–12 inches below) the underside of roof 17 so that the underside of the roof serves as a deflector to aid in the distribution of the lading as it is loaded into the car. In this manner, it will be understood that substantially the entire volume of car body 3 may be automatically, pneumatically loaded by a single attendant standing at track level without the necessity of man holes or walkways on top of the car. However, within the broader aspects of this invention, standpipes 113 may be of any length and the discharge ends 115 may be located near the bottom of the car and may or may not be equipped with a suitable defector (not shown). Also, the pneumatic loading system of the present invention eliminates the necessity of moving the car relative to a filling spout, or moving the filling spout relative to the car, which is conventional in top-loaded cars via hatches or manways provided in the roof of the car.

Because the loading system of the present invention 111 eliminates the need for hatches and manway covers on roof 17, the height of the car can be increased so that the roof is just below the maximum height permitted by the American Association of Railroad clearance diagrams (referred to AAR Plate B or C clearances), with these clearances being shown in phantom surrounding the cross section of car 1 of the present invention in FIG. 2.

As heretofore stated, a primary object of the present invention is the provision of a covered hopper car having markedly increased lading volume, as compared with conventional prior art covered hopper cars, and yet the covered hopper car of the present invention being within AAR clearances. By way of comparison, ACF Industries, Incorporated's CENTERFLOW ® covered hopper car, Model 5701, generally similar to that shown in U.S. Pat. No. 3,339,499, has a length over the strikers of 62 feet, and a lading volume of 5,700 cubic feet. Further, ACF Industries, the assignee of the present invention, has heretofore designed and built a Model 5,700 covered hopper car, having a length over the strikers of 65 feet, 8 inches, but this prior Model 5,700 car had a lading volume of 5,700 cubic feet. Thus, the Model 5,700 car required considerable additional weight with no appreciable increase in lading volume. In U.S. Pat. No. 4,598,646, and invented by Richard H. Dugge and Donald E. Gruner, another embodiment of a high volume covered hopper car is disclosed in which increased volume is achieved through forming the side sheets of the car from three different radii of curvature. This last-mentioned car had a length over the strikers of 65 feet, 8 inches, had sloped end sheets, and had a lading volume of 6,404 cubic feet. Loading of this last-mentioned car was accomplished through the use of hatches or manways provided in the roof of the car in the conventional manner In contrast, a car of the same length and construction as the above-mentioned high volume covered hopper car, having a length over the strikers of 65 feet, 8 inches, could have its lading volume increased to 6,620 cubic feet, if the pneumatic loading system 111 of the present invention was included in the car, thus permitting the roof of the car to be raised by eliminating the necessity of hatches, manways, walkways and the like from the roof, while still remaining within AAR clearances. It will also be noted that by eliminating manways and the like from the roof of the car, it is not possible or necessary for personnel to have access to the roof, and thus loading and unloading of the cars utilizing the pneumatic loading system 111 of the present invention eliminates the necessity of attendants from walking on the roof.

Still further in accordance with the present invention, the pneumatic unloading system 29 of the present invention in conjunction with the pneumatic loading system 111 permits still a further increase in lading volume, in that the space over the trucks of the car may be utilized as lading volume by the elimination of the end slope sheets of prior art cars. More specifically, the car shown in FIGS. 1-4 of the present invention has a length over the strikers of 69 feet, 4 inches, and a lading volume of 7,837 cubic feet, which represents a 2,137 cubic feet increase in lading volume, or a 37.5 percent increase, as compared with a conventional ACF Model 5,701C CENTERFLOW ® covered hopper car with only a 12.4 percent increase in length. Thus, the car 1 of the present invention exhibits a considerable increase in lading volume out of proportion to its increased length, due to the increased length such that the car 1 of the present invention efficiently utilizes the materials from which it is constructed to increase its lading volume.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. A railway car having a truck at each end thereof, a pair of spaced side sheets extending generally lengthwise of the car and forming the sides thereof, an end sheet at each end of the car spanning between the ends of the side sheets, a central floor extending between said trucks and an end floor at each end thereof above a respective truck, a plurality of pneumatic outlets constituting, at least in part, the central and end floors of said car, said outlets being generally horizontal and being in communication with a plulverant lading within said car with certain of said outlets in said end floors being disposed above said trucks such that substantially all of the space above said trucks is effectively used to carry a lading and such that the lading above said trucks is unloaded via sid certain outlets, a flow path in fluid coupled relation with each of said outlets, said flow path having an inlet end and a product discharge end, said product discharge end being selectively connectable to means for moving air and lading entrained in the air through said flow path, valve means associated with each of said pneumatic outlets for opening and closing communication between each of said pneumatic outlets and said flow path such that when one of said outlets is in communication with said flow path, said lading in said car in operative association with said one outlet will become entrained in the air moving through said flow path such that the lading is pneumatically conveyed from the car, and control means responsive to the amount of lading being conveyed through said flow path from said one outlet for opening and closing said valve means associated with said one outlet thereby to maintain the amount of lading being conveyed from one outlet within a predetermined range.

2. A car as set forth in claim 1 further comprising a roof spanning between the upper margins of said side sheets, and means for loading said lading into said car from below, said loading means comprising at least one standpipe disposed within said car, said standpipe having an inlet end accessible from the exterior of said car to a convenient level by a train attendant standing on the ground, and an outlet end within said car, said inlet end being cooperable with pneumatic loading means such that said particulate lading is pneumatically blown into said car via said standpipe and discharged within the interior of said car, said car further having means for maintaining said car substantially at atmospheric pressure during both loading and unloading.

3. A car as set forth in claim 1 wherein said pneumatic outlets are disposed in in at least one row extending generally longitudinally of the car, said pneumatic outlets being connected to others of said pneumatic outlets via a fluid conduit constituting at least a part of said flow path for the forced flow of air through said flow path from said air inlet end, past each of said pneumatic outlets, and to said product discharge end.

4. A car as set forth in claim 3 wherein said flow path constitutes a loop from said air inlet end through said conduits and pneumatics outlet means to said product discharge end.

5. A car as set forth in claim 1 further including a roof, means for pneumatically loading said lading into said car from below said roof by discharging air under pressure and lading entrained therewith into said car, said loading means comprising at least one vertical standpipe within said car having an inlet disposed for access by a train attendent at track level and an outlet end within said car, and means for maintaining the interior of said car substantially at atmospheric pressure, both during pneumatic loading and pneumatic unloading of said lading.

6. A railway car as set forth in claim 1 wherein said control means comprises pressure sensing means in communication with said flow path for sensing changes in pressure indicative of changes in the amount of lading being conveyed through said flow path, said valve means for each of said outlets including power operated means for opening and closing its respective said valve means, said control means in response to said changes in pressure effecting operation of said power operated means thereby to maintain the amount of lading being conveyed from said one outlet within said predetermined range.

7. A car as set forth in claim 6 wherein said control system further comprises means for generating a signal in response to the pressure changes of said air and said lading moving through said flow path changing beyond a predetermined range of pressure changes thereby to indicate that the lading in operative association with said one pneumatic outlet has been substantially unloaded.

8. A car as set forth in claim 7 wherein said pneumatic outlets are arranged in at least one row and are connected by a conduit so as to constitute said flow path, said predetermined range of pressure changes requried to maintain the amount of lading conveyed from said one outlet being such as to accommodate the pressure changes sensed when said lading is being unloaded via a first pneumatic outlet, via the last pneumatic outlet, or via any intermediate pneumatic output in said flow path, and, so as to accommodate other flow characteristics in said flow path, and to optimize unloading of substantially all of said lading in operative association with said pneumatic outlet, said control system having means for sensing said change in pressure beyond said predetermined range of pressure changes, for effecting the closing of said one outlet, and for opening communication between another of said outlets and said flow path.

9. A car as set forth in claim 7 wherein each of said pneumatic outlet valve means has power operated means associated therewith for selectively opening and closing said valve means under the control of said control means, and wherein each of said power operated means is a fluid cylinder actuator, each of said actuators having a first fluid inlet and a second fluid inlet for the admittance of a pressurized fluid into said actuator thereby to selectively move said valve associated with each said actuator, a source of pressurized fluid, means for connecting said first and second fluid inlets of each of said actuators to said source, actuator valve means in said connecting means operable by said control means for opening and closing said control valve associated with each of said actuators.

10. A car as set forth in claim 9 wherein said actuator value means are solenoid valves having lead wires for supplying electrical power to said solenoid valves, said electrical leads being terminated at a plug located at a convenient location on said car, said control means being located remotely from said car and having a power cable for connection to said plug means thereby to operatively connect said solenoid values to said control means.

11. A car as set forth in claim 7 wherein said mean for sensing said pressure differential is dowstream from said product discharge end of said flow path.

12. A railway car as set forth in claim 6 wherein said control means includes means for sensing the exhaustion of lading in operative communication with said one outlet, said control means blocking communication between said one outlet and said flow path upon sensing said exhaustion of lading from said one outlet, and for opening communication between another of said outlets and said flow path thereby to convey the lading within said car in operative communication with said other outlet.

13. A railway car as set forth in claim 6 wherein said control means includes means for delaying closing of said one outlet and opening another of said outlets for a predetermined length of time thereby to ensure that substantially all of said lading in operative communication with said one outlet is conveyed from said railway car before said one outlet is closed.

14. A covered hopper car having a truck at each end thereof, a covered hopper body carried by said trucks, said covered hopper body comprising a pair of spaced side sheets, a roof spanning between the top margins of said side sheets, an end wall at each end of said car, said roof being free of hatches, walkways and the like so that the height of said car above the rails is maximized while remaining AAR clear clearances, said car further including means for pneumatically loading a particulate lading into said hopper body from below without the necessity of access into said hopper body from said roof, said means for pneumatically loading said lading into said car comprises at least one standpipe disposed vertically within said car, the upper end of said standpipe constituting an outlet end, the other or inlet end of said standpipe being disposed for operative connection to means for pneumatically conveying lading to said standpipe, said standpipe inlet end being disposed proximate the lower reaches of the exterior of said car for ready access thereto by an attendant standing on the ground substantially at track level, said outlet end of said standpipe being disposed on the interior of said car for substantially filling said car with said lading, and means for maintaining the interior of said car body substantially at atmospheric pressure during pneumatic loading, said car further comprising a central floor extending between said trucks and an end floor at each end thereof above a respective truck, and means for pneumatically unloading said lading from the car, said pneumatic unloading means comprises a plurality of pneumatic outlets disposed in said central foor and in said end floors, said pneumatic outlets being operatively connected to one another via conduit means for the forced flow of air throughs said conduit means and through said pneumatic outlets, each of said pneumatic outlets having a control valve between said conduit means and said lading within said car, said control valve being operable between a closed position in which the flow of lading from within the car via a respective outlet is blocked from entering said conduit means and an open position in which said lading is free to flow through said control valve for being entrained in the air flowing through said conduit means, power operated means for selectively opening and closing each of said control valves, and a control system for selectively operating each of said power operated means associated with each of said control valves one outlet at a time in response to changes in the flow of air and lading pneumatically conveyed out of the car via one outlet thereby to ensure that said lading in operative association with said one outlet in communication with said conduit is fully unloaded by said one outlet and so that upon the substantially complete unloading of the lading in communicaition with said one outlet, the control valve associated with said one outlet is closed, and the control valve associated with another of said outlet is opened thereby to provide continued and automatic unloading of the lading from within the car one outlet at a time until all of the lading has been unloaded, said end wall being vertical, said pneumatic outlets being generally horizontal with at least some of said pneumatic outlets being positioned above said trucks such that the space above said trucks delimited by said certain of said outlets at the bottom, said roof at the top, said side sheets and said vertical end wall is substantially fully utilized for the transport of lading and such that this lading above said trucks is unloaded by said certain pneumatic outlets.

* * * * *